United States Patent
Bader et al.

(10) Patent No.: US 10,072,107 B2
(45) Date of Patent: Sep. 11, 2018

(54) LONG CHAIN BRANCHED POLYPROPYLENE

(71) Applicants: TOTAL RESEARCH & TECHNOLOGY FELUY, Seneffe (BE); CENTRE NATIONAL DE LA RECHERCHE SCIENTIFIQUE (CNRS), Paris (FR)

(72) Inventors: Manuela Bader, Villefranche sur Saône (FR); Jean-françois Carpentier, Acigné (FR); Evgueni Kirillov, Rennes (FR); Olivier Lhost, Havré (BE); Christian Lamotte, Arquennes (BE); Katty Den Dauw, Woluwé-Saint-Lambert (BE)

(73) Assignees: Total Research & Technology Feluy, Seneffe (BE); Centre National de la Recherche Scientifique (CNRS), Paris (FR)

( * ) Notice: Subject to any disclaimer, the term of this patent is extended or adjusted under 35 U.S.C. 154(b) by 0 days.

(21) Appl. No.: 15/102,073

(22) PCT Filed: Dec. 5, 2014

(86) PCT No.: PCT/EP2014/076781
§ 371 (c)(1),
(2) Date: Jun. 6, 2016

(87) PCT Pub. No.: WO2015/082709
PCT Pub. Date: Jun. 11, 2015

(65) Prior Publication Data
US 2016/0304639 A1    Oct. 20, 2016

(30) Foreign Application Priority Data
Dec. 6, 2013 (EP) .................................. 13290301

(51) Int. Cl.
| | | |
|---|---|---|
| *C08F 110/06* | (2006.01) | |
| *C08F 4/6592* | (2006.01) | |
| *C08F 4/653* | (2006.01) | |
| *C08F 2/00* | (2006.01) | |
| *C08F 4/659* | (2006.01) | |

(52) U.S. Cl.
CPC ............ *C08F 110/06* (2013.01); *C08F 2/001* (2013.01); *C08F 4/65904* (2013.01); *C08F 4/65912* (2013.01); *C08F 4/65927* (2013.01)

(58) Field of Classification Search
CPC .. C08F 2/001; C08F 4/65927; C08F 4/65904; C08F 10/06
See application file for complete search history.

(56) References Cited

U.S. PATENT DOCUMENTS

| | | | | |
|---|---|---|---|---|
| 6,197,910 B1* | 3/2001 | Weng | ..................... | C08F 10/00 526/348 |
| 8,445,608 B2* | 5/2013 | Carpentier | ............ | C08F 210/06 526/113 |
| 2004/0204310 A1* | 10/2004 | Gauthier | ................. | C08F 10/00 502/103 |
| 2011/0003953 A1* | 1/2011 | Kirillov | ................. | C07F 17/00 526/170 |

FOREIGN PATENT DOCUMENTS

| | | |
|---|---|---|
| DE | 4425787 A1 | 1/1996 |
| EP | 0277004 A1 | 8/1988 |
| EP | 0427696 A2 | 5/1991 |
| EP | 1422250 A1 | 5/2004 |
| EP | 2196481 A1 | 6/2010 |
| WO | 2005075525 A2 | 8/2005 |
| WO | 2007127465 A2 | 11/2007 |

OTHER PUBLICATIONS

International Search Report issued in PCT/EP2014/076781, dated Jan. 22, 2015, 3 pages.
Weng et al., "Synthesis of Vinyl-Terminated Isotactic Poly(propylene)" Macromolecular Rapid Communications, 2000, 21, 1103-1107.
Weng et al., "Synthesis of Long-Chain Branched Propylene Polymers via Macromonomer Incorporation" Macromolecular Rapid Communications, 2001, 22, 1488-1492.
Weng et al. "Long Chain Branched Isotactic Polypropylene" Macromolecules 2002, 35, 3838-3843.
Juengling et al. "Modified Syndiotactic Polypropene: Poly(Propene-Co-Octene) and Blends with Atactic Oligopropene", Angewandte Makromolekulare Chemie. Applied Macromolecular Chemistry and Physics, Wiley VCH, Weinheim, DE, (Jul. 1, 1995), vol. 229; pp. 93-112.
Bader et al, "Old and new C1-symmetric Group 4 metallocenes {(R1R2C)-(R2'R3'R6'R7'-Flu)(3-R3-5-R4-C5H2)}ZrCl2: From Highly Isotactic Polypropylenes to Vinyl End-Capped Isotactic-Enriched Oligomers", Organometallics, 31(23), 8375-8387, (2012).
Razavi et al., "The Geometry of the Site and Its Relevance for Chain Migration and Stereospecificity", Macromol. Symp., vol. 89, 1995, pp. 345-367.

* cited by examiner

*Primary Examiner* — Caixia Lu
(74) *Attorney, Agent, or Firm* — Albert Shung

(57) ABSTRACT

A process for preparing a long chain branched polypropylene in presence of two metallocene-based active catalyst systems is provided. The polypropylene obtained therefrom has new molecular architecture and improved elasticity properties. The polypropylene is further characterized by new signals in its $^{13}C$ NMR spectrum.

10 Claims, 2 Drawing Sheets

LONG CHAIN BRANCHED POLYPROPYLENE

CROSS-REFERENCE TO RELATED APPLICATIONS

This application is a National Stage Entry of PCT/EP2014/076781, filed on Dec. 5, 2014, which claims priority from EP 13290301.4, filed on Dec. 6, 2013, the entireties of which are incorporated herein by reference.

TECHNICAL FIELD

The present invention relates generally to the field of polypropylene, and in particular to polypropylene having long chain branchings. The present invention further relates to a process for the preparation of said long chain branched polypropylene.

DESCRIPTION OF RELATED ART

Polypropylene is a commodity polymer well appreciated in many applications. However, one of the major drawbacks of polypropylene is the low melt strength of the grades usually proposed on the market. This has strong implications in the use of polypropylene:
- in blown film market, to avoid bubble stability issues, high molecular weight polypropylene grades are used. Due to the associated high viscosity, there are usually throughput restrictions;
- in thermoforming application, when heating the sheets, sagging is a currently reported problem, imposing to use appropriate MFI (low MFI values, typically MFI=3 g/10 min.);
- foam market is strongly reduced for polypropylene. Very specific, sophisticated and constraint processes like "PP expanded bead" technology exist but it is known that polypropylene foam production is harder than with polyethylene appropriate grades.

To improve the melt strength, introduction of long chain branching in the polymer architecture is often reported in literature. To do so, several options are known: radical treatments, copolymerization of propylene with α,ω-dienes or functional monomer, or formation of macromers with vinyl end-groups using a metallocene catalyst under specific reactor conditions followed by copolymerization of macromers with propylene to get long chain branched polypropylene.

The above mentioned options have, however, strong limitations. Radical treatments are expensive due to the need to use high content of specific radical initiators like peroxydicarbonate compounds. Industrial quantities of α,ω-dienes are not really available. Moreover, α,ω-dienes remaining on the fluff after polymerization must be eliminated (which is a difficult and expensive operation) and recycled.

The third option, i.e. long chain branching formation via production of macromers using a given metallocene catalyst followed by copolymerization of the macromers with propylene in a second step using the same catalyst are known (Weng et al., Macromolecular Rapid Communications, 2000, 21, 1103 and Weng et al., Macromolecular Rapid Communications, 2001, 22, 1488). The long chain branching polypropylene, obtained by Weng et al. via a two-step synthesis with the same catalysts, has specific $^{13}$C NMR features (Weng et al. Macromolecules 2002, 35, 3838-3843). The authors assigned the resonances at δ44.88, 4474, 44.08 and 3174 ppm to the long chain branching. The experimental conditions disclosed, however, are not interesting from an industrial point of view. Indeed, the production of macromers at temperature around 120° C. and the macromer isolation before introduction for a further incorporation in a polypropylene growing chain are often not optimal or even detrimental for the catalyst activity and an easy industrial implementation.

EP 2 196 481 discloses a method for preparing a branched polypropylene comprising contacting propylene with a first non-bridged catalyst to form relatively short macromers (about five units long, cf. scheme 3 of EP 2 196 481) and simultaneously with a second, bridged catalyst to form a polypropylene backbone incorporating the macromers as side branches. The melt strength properties of a thus-produced polypropylene are moderate because of the low entanglement provided by the relatively short branches. The catalyst system is even not active in sequential polymerization with an amount of the first catalyst greater than the amount of the second catalyst DE 44 25 787 discloses a process for the preparation of polypropylene by polymerization of propylene in presence of a non-bridge metallocene, i.e. Cp*$_2$ZrCl$_2$, and a bridged metallocene Me$_2$Si-bis(2-methylindenyl)ZrCl$_2$. Polypropylene having low melting point is obtained.

It is also known from Jüngling et al. the preparation of polymer blends in presence of two catalysts, Cp$_2$ZrCl$_2$ and Me$_2$C(Cp)(Flu). Polypropylene with long chain branching is not observed.

EP 1 422 450 discloses the preparation of branched polypropylene comprising the formation of macromers from olefin monomer and the polymerization of propylene in presence of macromers.

Hence, there is a need for a cost-competitive way to produce polypropylene with improved melt strength properties.

The present invention aims at providing a process and a long chain branched polypropylene that addresses the above-discussed drawbacks of the prior art.

SUMMARY OF THE INVENTION

In a first aspect, the present invention relates to a process for the preparation of polypropylene having long chain branchings. Said process comprises the steps of:
(a) providing in a reactor a first active catalyst system comprising an activating agent having an alkylating and/or ionizing action and a first precatalyst of formula (I)

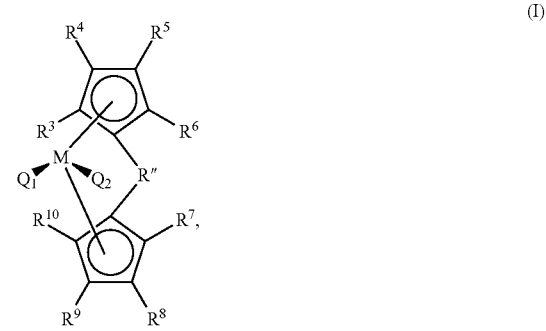

wherein

M is a group IV transition metal;

$Q^1$ and $Q^2$ are identical or different and are independently selected from the group consisting of amido, halogen, $C_1$-$C_{10}$ alkyl group, $C_6$-$C_{20}$ aryl group, an anionic ligand or a neutral ligand capable of coordination by a lone pair of electrons;

R" is of formula —$[Z(R^1)(R^2)]_n$— n is an integer between 1 and 5;

Z is a carbon or silicon;

$R^1$ and $R^2$ are identical or different and are independently selected from the group consisting of hydrogen. $C_1$-$C_{30}$ alkyl groups optionally substituted by one or more substituents, $C_1$-$C_{30}$ alkenyl groups optionally substituted by one or more substituents, $C_6$-$C_{40}$ aryl groups optionally substituted by one or more substituents, or $R^1$ and $R^2$ together with the atom Z to which they are attached form a three- to thirty-membered ring optionally substituted by one or more substituents;

$R^3$ to $R^{10}$ are identical or different and are independently selected from the group consisting of hydrogen, $C_1$-$C_{30}$ alkyl groups optionally substituted by one or more substituents. $C_6$-$C_{40}$ aryl groups optionally substituted by one or more substituents, or two of the substituents $R^3$ to $R^6$ or $R^7$ to $R^{10}$ attached to a carbon atom positioned vicinal to each other respectively, form with the carbon atom to which they are attached a cycloalkenyl or aryl group optionally substituted by one or more substituents, with the proviso that said first precatalyst is not $[R(2-R'_3Si-Ind)_2]MQ_2$ wherein R' is alkyl having from 1 to 6 carbon atoms and R is a C— or Si-bridge between the two indenyl moieties, (b) injecting propylene, either before or after or simultaneously with step (a), to produce polypropylene macromers, (c) providing a second active catalyst system comprising a second precatalyst and an activating agent having an alkylating and/or ionizing action, said second precatalyst being different from said first precatalyst and being of formula (I) as defined above without the proviso, (d) maintaining under polymerization conditions, (e) retrieving a polypropylene having long chain branchings.

In the present invention, the term macromer is given its commonly recognized meaning of any polymer or oligomer that has a functional group that can take part in further polymerization. Preferably, the polypropylene macromers may have vinyl-terminated chains and/or vinylidene-terminated chains. The first active catalyst system is selected such that, in presence of propylene, polypropylene macromers are produced. The first active catalyst system is prepared by contacting an activating agent having an alkylating and/or ionizing action with the first precatalyst. The second active catalyst system is selected for its macromer incorporation aptitude. Indeed, the second active catalyst system produce polypropylene incorporating at least part of the polypropylene macromers produced by said first active catalyst system.

The present process relates to the combined use of two active catalyst systems, each comprising a precatalyst as defined herein. The first precatalyst used is capable, when activated with the activating agent, of producing unsaturated macromers while the second precatalyst, when activated with the activating agent, is capable of incorporating the produced macromers in a polypropylene chain. Compared to the use of one single (pre)catalyst, the linear viscoelastic properties of the polymer produced according to the present process highlights a more significant deviation from the linear grades (free of branchings).

In a preferred embodiment, steps (a) to (c) are carried out simultaneously by contacting said first and second precatalysts in the reactor together with the propylene. The activating agent may be also added simultaneously to said first and second precatalysts. Said first and second active catalyst systems may therefore be prepared simultaneously.

In a preferred embodiment, said first and second precatalysts may be of formula (I) as defined above wherein M is zirconium, hafnium or titanium; $Q^1$ and $Q^2$ are identical or different and are independently selected from the group consisting of amido, halogen, $C_1$-$C_{10}$ alkyl group, $C_6$-$C_{20}$ aryl group;

R" is of formula —$[Z(R^1)(R^2)]_n$— wherein n is 1 or 2, Z is a carbon or silicon, and $R^1$ and $R^2$ are identical or different and are independently selected from the group consisting of hydrogen, $C_1$-$C_6$ alkyl group, phenyl group optionally substituted by one or more substituents.

In a second aspect of the present invention, a long chain branched polypropylene is provided. Said long chain branched polypropylene may have $^{13}C$ NMR spectrum containing signals at 44.88, 44.74, 44.08 and 31.74 ppm and at least one or more of the following signals at 51.1, 49.0, 38.9, 27.1, 26.6, 24.0, 23.3, 23.0, 22.9 or 19.8 ppm.

In a preferred embodiment, said long chain branched polypropylene may have a loss angle, δ, evolution as a function of complex modulus G* comprising a portion which increases with the complex modulus in the range of G* greater than 300 Pa, preferably 500 Pa, more preferably 1,000 Pa.

Said long chain branched polypropylene may have long chain branching having a molecular weight Mn of at least 6,000 g·mol$^{-1}$, preferably at least 7,000 g·mol$^{-1}$, more preferably at least 8,000 g·mol$^{-1}$. Said long chain branching may have at least 420 carbon atoms, preferably at least 500 carbon atoms, more preferably at least 600 carbon atoms.

DETAILED DESCRIPTION OF THE INVENTION

Figure 1:
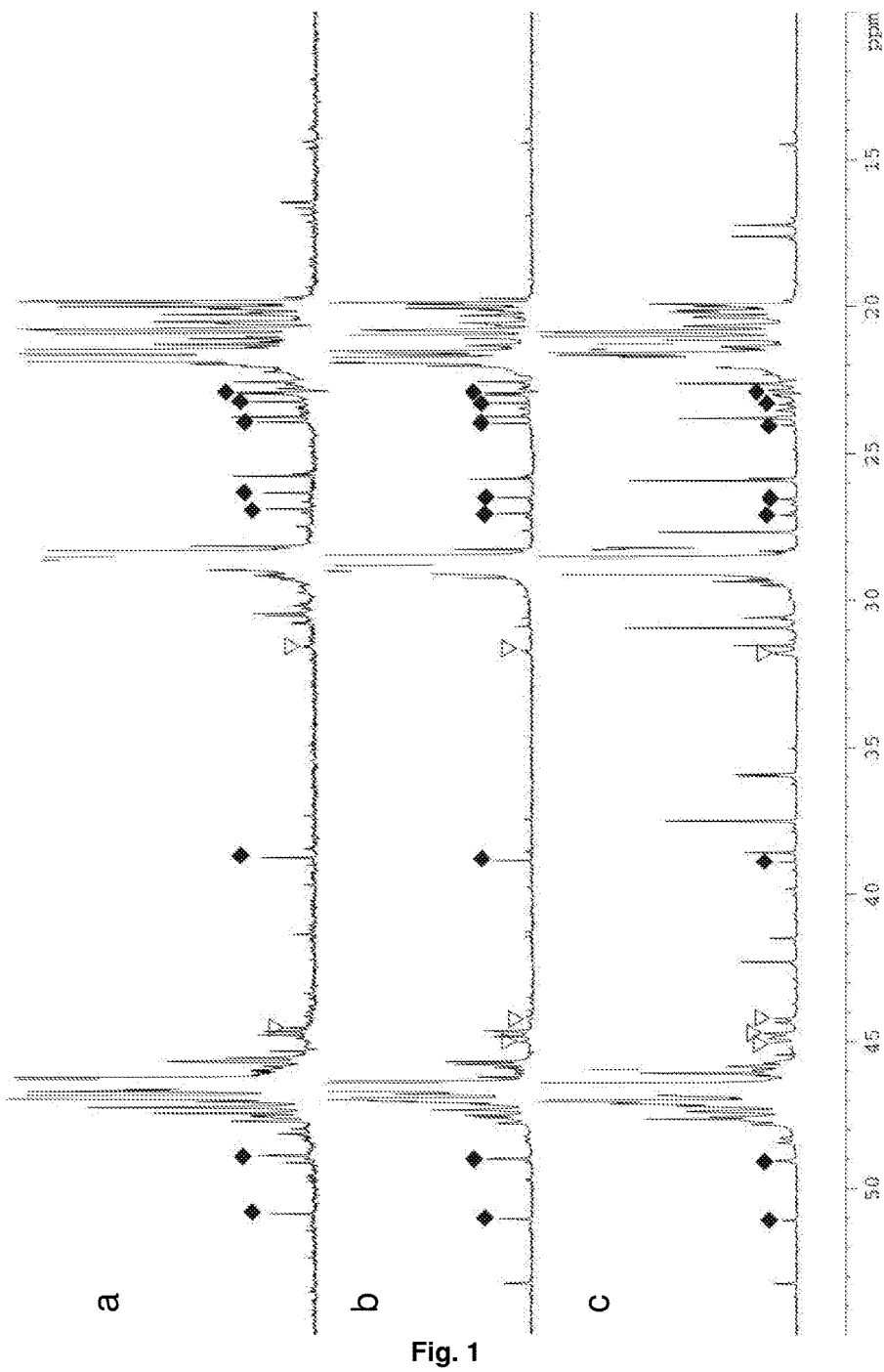
FIG. 1a-c represent the $^{13}C\{^1H\}$ NMR spectrum (at 125 MHz, recorded at 130° C. in 1,2,4-trichlorobenzene/$C_6D_6$) of the polypropylene obtained according to the present invention, i.e. in presence of precatalysts 3c/1 (a), 3c/3b (b) and 3c/3f (c) respectively.

As used herein, the term "alkyl" by itself or as part of another substituent refers to a hydrocarbyl radical of formula $C_nH_{2n+1}$ wherein n is a number greater than or equal to 1. Generally, alkyl groups of the present invention comprise from 1 to 30 carbon atoms, preferably from 1 to 20 carbon atoms, more preferably from 1 to 10 carbon atoms. The term "alkyl" encompasses linear or branched alkyl. Optionally, the term "alkyl" may encompass alkyl groups substituted or not by one or more substituents. When a subscript is used herein following a carbon atom, the subscript refers to the number of carbon atoms that the named group may contain. Thus, for example, $C_1$-$C_{10}$ alkyl means an alkyl of one to ten carbon atoms. For example, the "$C_1$-$C_{10}$ alkyl" refers but is not limited to methyl, ethyl, n-propyl, i-propyl, n-butyl, i-butyl, s-butyl, t-butyl, 1-pentyl, 2-pentyl, 3-pentyl, i-pentyl, neo-pentyl, t-pentyl, 1-hexyl, 2-hexyl, 3-hexyl, 1-methyl-1-ethyl-n-pentyl, 1,1,2-tri-methyl-n-propyl, 1,2,2-trimethyl-n-propyl, 3,3-dimethyl-n-butyl, 1-heptyl, 2-heptyl, 1-ethyl-1,2-dimethyl-n-propyl, 1-ethyl-2,2-dimethyl-n-propyl, 1-octyl, 3-octyl, 4-methyl-3-n-heptyl, 6-methyl-2-n-heptyl, 2-propyl-1-n-heptyl, 2,4,4-trimethyl-1-n-pentyl, 1-nonyl, 2-nonyl, 2,6-dimethyl-4-n-heptyl, 3-ethyl-2,2-dimethyl-3-n-pentyl, 3,5,5-trimethyl-1-n-hexyl, 1-decyl, 2-decyl, 4-decyl, 3,7-dimethyl-1-n-octyl, 3,7-dimethyl-3-n-octyl.

As used herein, the term aryl refers to a polyunsaturated, aromatic hydrocarbyl group having a single ring (i.e. phenyl) or multiple aromatic rings fused together (e.g. naphtyl) or linked covalently, typically containing 6 to 40 carbon atoms, preferably 6 to 20 carbon atoms, more preferably 6 to 18 wherein at least one ring is aromatic. Non-limiting examples of aryl comprise phenyl, biphenylyl, biphenylenyl, tetralinyl, azulenyl, naphthalenyl, indenyl, acenaphthenyl, phenanthryl, indanyl, pyrenyl. Optionally, the term "aryl" encompasses aryl substituted by one or more substituent(s).

As used herein, the term cycloalkenyl refers to unsaturated monocyclic hydrocarbons having one endocyclic double bond.

Whenever the term "substituted" is used in the present invention, it is meant to indicate that one or more hydrogen on the atom indicated in the expression using "substituted" is replaced with a selection from the indicated group, provided that the indicated atom's normal valence is not exceeded, and that the substitution results in a chemically stable compound, i.e. a compound that is sufficiently robust to survive isolation to a useful degree of purity from a reaction mixture. Substituents may be selected from the group comprising halogen, amino, heterocycle, amido, ether, ester, cyano, oxy derivative.

The term "halogen" as used herein refers to F, Cl, Br, or I. The term "cyano" as used herein refers to the group —CN. The term "amido" as used herein refers to the group —C(O)—NR$^a$R$^b$ or —N(R$^a$)—C(O)—R$^b$ wherein R$^a$ and R$^b$ independently represents hydrogen, $C_3$-$C_{10}$ cycloalkyl, $C_6$-$C_{18}$ aryl, $C_1$-$C_{15}$ alkyl, $C_3$-$C_{10}$ heterocycle, $C_2$-$C_{15}$ alkenyl, $C_2$-$C_{15}$ alkynyl, or R$^a$ and R$^b$ are taken together with the nitrogen atom to which they are attached to form a three to ten membered N-heterocycle. The term "heterocycle", as used herein as a substituent is defined as including an aromatic or non aromatic cyclic alkyl, alkenyl, aryl or alkynyl moiety as defined herein, having at least one O, P, S and/or N atom interrupting the carbocyclic ring structure. The term "ester" refers to the group —C(O)—O—R$^c$ or —O—C(O)—R$^c$ wherein R$^c$ represents a moiety selected from the group consisting of hydrogen, $C_3$-$C_{10}$ cycloalkyl, $C_6$-$C_{18}$ aryl, $C_1$-$C_{15}$ alkyl, $C_3$-$C_{10}$ heterocycle, $C_2$-$C_{15}$ alkenyl, $C_2$-$C_{15}$ alkynyl. The term "oxy derivative", as used herein refers to —O—R$^c$ groups wherein R$^c$ is as defined above. The term "amino" by itself or as part of another substituent refers to a group of formula —N(R$^a$)(R$^b$) wherein R$^a$ and R$^b$ are as defined above. The term "ether" is defined as including a group selected from $C_1$-$C_{50}$ straight or branched alkyl, or $C_2$-$C_{50}$ straight or branched alkenyl or alkynyl groups or a combination of the same, interrupted by one or more oxygen atoms. The term "alkenyl" as used herein, is defined as including branched and unbranched, monovalent or divalent unsaturated hydrocarbon radicals having at least one double bond. The term "alkynyl" as used herein, is defined as including a monovalent branched or unbranched hydrocarbon radical containing at least one carbon-carbon triple bond. The term "three- to thirty-membered ring" as used herein refers to a three to thirty-membered carbocyclic ring structure interrupted by Z as defined herein, i.e. Z is carbon or silicon.

In a first aspect of the present invention, a process for the preparation of polypropylene having long chain branchings is provided. Said process comprises the steps of:
(a) providing in a reactor a first active catalyst system comprising an activating agent having an alkylating or ionizing action and a first precatalyst of formula (I)

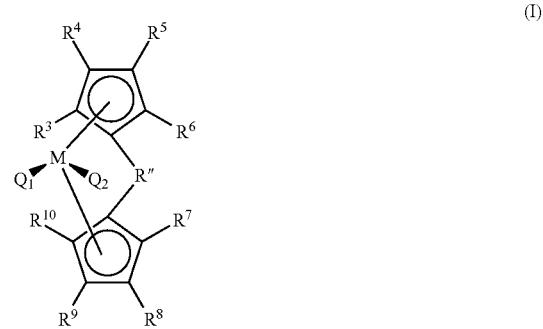

(I)

M is a group V transition metal;
$Q^1$ and $Q^2$ are identical or different and are independently selected from the group consisting of amido, halogen, $C_1$-$C_{10}$ alkyl group, $C_6$-$C_{20}$ aryl group, an anionic ligand or a neutral ligand capable of coordination by a one pair of electrons;
R" is of formula —[Z(R$^1$)(R$^2$)]$_n$—
n is an integer between 1 and 5;
Z is a carbon or silicon;
R$^1$ and R$^2$ are identical or different and are independently selected from the group consisting of hydrogen, $C_1$-$C_{30}$ alkyl groups optionally substituted by one or more substituents, $C_1$-$C_{30}$ alkenyl groups optionally substituted by one or more substituents, $C_6$-$C_{40}$ aryl groups optionally substituted by one or more substituents, or R$^1$ and R$^2$ together with the atom Z to which they are attached form a three- to thirty-membered ring optionally substituted by one or more substituents;
R$^3$ to R$^{10}$ are identical or different and are independently selected from the group consisting of hydrogen, $C_1$-$C_{30}$ alkyl groups optionally substituted by one or more substituents, $C_6$-$C_{40}$ aryl groups optionally substituted by one or more substituents, or two of the substituents R$^3$ to R$^6$ or R$^7$ to R$^{10}$ attached to a carbon atom positioned vicinal to each other respectively, form with the carbon atom to which they are attached a cycloalkenyl or aryl group optionally substituted by one or more substituents,
with the proviso that said first precatalyst is not [R(2-R'$_3$Si-Ind)$_2$]MQ$_2$ wherein R' is alkyl having from 1 to 6 carbon atoms and R is a C— or Si-bridge between the two indenyl moieties,
(b) injecting propylene, either before or after or simultaneously with step (a), to produce polypropylene macromers,
(c) providing a second active catalyst system comprising a second precatalyst and an activating agent having an alkylating and/or ionizing action, said second precatalyst being different from said first precatalyst and being of formula (I) as defined above without the proviso,
(d) maintaining under polymerization conditions,
(e) retrieving a polypropylene having long chain branchings.

Said first precatalyst, when activated, or said first active catalyst system comprising the same may be capable of producing polypropylene macromers having vinyl-terminated chains and/or vinylidene-terminated chains. In a preferred embodiment, the first precatalyst, when activated, or said first active catalyst system may produce macromers having at least 10% vinyl- and/or vinylidene-terminated chains content based on the total amount of terminated chains of the macromers, preferably at least 30% vinyl- and/or vinylidene-terminated chains content, more preferably at least 40%, most preferably at least 50% vinyl- and/or vinylidene-terminated chains content.

Said polypropylene macromers may have a molecular weight Mn of at least 6,000 g·mol$^{-1}$, preferably at least 7,000 g·mol$^{-1}$, more preferably at least 8,000 g·mol$^{-1}$. Said polypropylene macromers may have at least 420 carbon atoms, preferably at least 500 carbon atoms, more preferably at least 600 carbon atoms.

Without being bound by any theory, it is assumed that such long macromers can be produced thanks to inter alia the bridging R" which rigidifies the precatalyst molecule. By contrast, in EP 2 196 481, the first (pre)catalyst is non bridged and it can be seen in scheme 3 thereof that the side chains are rather short, counting not more than five repeating units. In paragraph [0018] of EP 2 196 481, a single bridge precatalyst [R(2-R'$_3$Si-Ind)$_2$]MQ$_2$ is mentioned but was not tested. Furthermore, no mention of any effect of the bridge R on the final polymer, let alone on the macromers length can be found in said document.

In a preferred embodiment, said first precatalyst may be of formula (IIa-c)

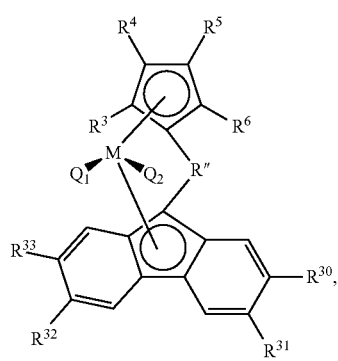

(IIa)

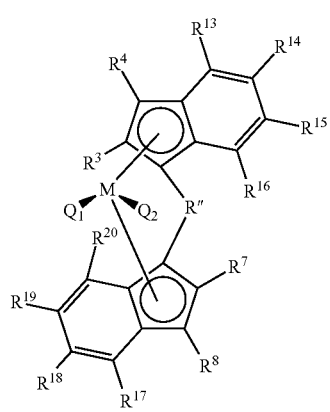

(IIb)

or

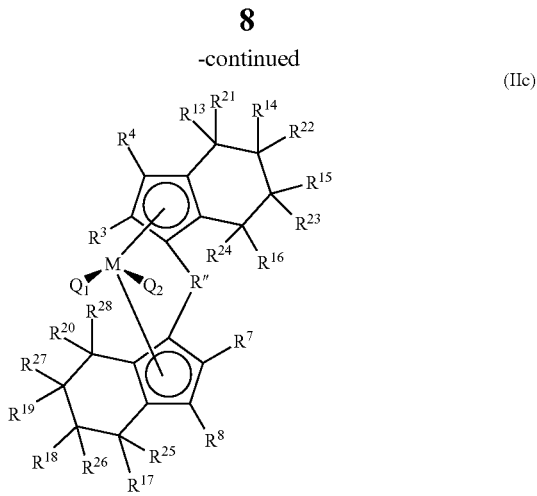

(IIc)

wherein

M is a group IV transition metal;

$Q^1$ and $Q^2$ are identical or different and are independently selected from the group consisting of amido, halogen, $C_1$-$C_{10}$ alkyl group. $C_6$-$C_{20}$ aryl group, an anionic ligand or a neutral ligand capable of coordination by a one pair of electrons;

R" is of formula —[Z($R^1$)($R^2$)]$_n$— n is an integer between 1 and 5;

Z is a carbon or silicon;

$R^1$ and $R^2$ are identical or different and are independently selected from the group consisting of hydrogen, $C_1$-$C_{30}$ alkyl groups optionally substituted by one or more substituents. $C_1$-$C_{30}$ alkenyl groups optionally substituted by one or more substituents, $C_6$-$C_{40}$ aryl groups optionally substituted by one or more substituents, or $R^1$ and $R^2$ together with the atom Z to which they are attached form a three- to thirty-membered ring optionally substituted by one or more substituents;

$R^3$ to $R^8$, $R^{13}$ to $R^{28}$ and $R^{30}$ to $R^{33}$ are identical or different and are independently selected from the group consisting of hydrogen. $C_1$-$C_{30}$ alkyl groups optionally substituted by one or more substituents. $C_6$-$C_{40}$ aryl groups optionally substituted by one or more substituents, or two of the substituents $R^3$ to $R^8$, $R^{13}$ to $R^{28}$ and $R^{30}$ to $R^{33}$ attached to a carbon atom positioned vicinal to each other respectively, form with the carbon atom to which they are attached a cycloalkenyl or aryl group optionally substituted by one or more substituents, with the proviso that said first precatalyst is not [R(2-R'$_3$Si-Ind)$_2$]MQ$_2$ wherein R' is alkyl having from 1 to 6 carbon atoms and R is a C— or Si-bridge between the two indenyl moieties.

Preferably, said first precatalyst may be of formula (IIa) or (IIc)

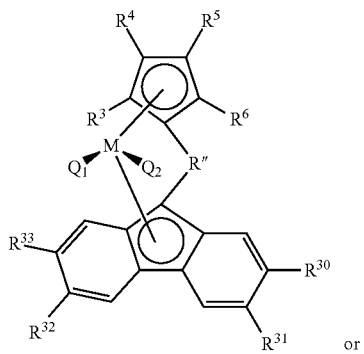

(IIa)

or

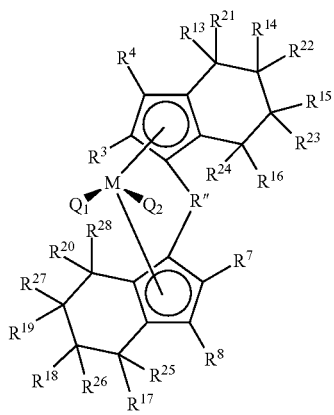

(IIc)

wherein
M is a group IV transition metal;
Q$^1$ and Q$^2$ are identical or different and are independently selected from the group consisting of amido, halogen, C$_1$-C$_{10}$ alkyl group, C$_6$-C$_{20}$ aryl group;
R" is of formula —[Z(R$^1$)(R$^2$)]$_n$—
n is an integer between 1 and 3;
Z is a carbon or silicon;
R$^1$ and R$^2$ are identical or different and are independently selected from the group consisting of hydrogen, C$_1$-C$_{10}$ alkyl groups optionally substituted by one or more substituents, C$_1$-C$_{10}$ alkenyl groups optionally substituted by one or more substituents, C$_6$-C$_{12}$ aryl groups optionally substituted by one or more substituents, or R$^1$ and R$^2$ together with the atom Z to which they are attached form a three- to thirty-membered ring optionally substituted by one or more substituents;
R$^3$ to R$^8$, R$^{13}$ to R$^{28}$ and R$^{30}$ to R$^{33}$ are identical or different and are independently selected from the group consisting of hydrogen, C$_1$-C$_{30}$ alkyl groups optionally substituted by one or more substituents, C$_6$-C$_{40}$ aryl groups optionally substituted by one or more substituents, or two of the substituents R$^3$ to R$^8$, R$^{13}$ to R$^{28}$ and R$^{30}$ to R$^{33}$ attached to a carbon atom positioned vicinal to each other respectively, form with the carbon atom to which they are attached a cycloalkenyl or aryl group optionally substituted by one or more substituents.

More preferably, said first precatalyst may be of formula (IIa)

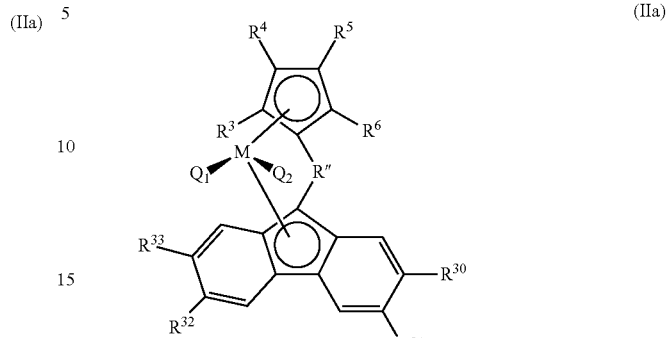

(IIa)

wherein
M is a group IV transition metal;
Q$^1$ and Q$^2$ are identical or different and are independently selected from the group consisting of amido, halogen, C$_1$-C$_{10}$ alkyl group, C$_6$-C$_{20}$ aryl group;
R" is of formula —[Z(R$^1$)(R$^2$)]$_n$—
n is 1 or 2;
Z is a carbon or silicon;
R$^1$ and R$^2$ are identical or different and are independently selected from the group consisting of hydrogen, C$_1$-C$_{10}$ alkyl groups optionally substituted by one or more substituents, C$_1$-C$_{10}$ alkenyl groups optionally substituted by one or more substituents, C$_6$-C$_{12}$ aryl groups optionally substituted by one or more substituents;
R$^3$ to R$^8$, R$^{13}$ to R$^{28}$ and R$^{30}$ to R$^{33}$ are identical or different and are independently selected from the group consisting of hydrogen, C$_1$-C$_{30}$ alkyl groups optionally substituted by one or more substituents, C$_6$-C$_{40}$ aryl groups optionally substituted by one or more substituents, or two of the substituents R$^3$ to R$^8$, R$^{13}$ to R$^{28}$ and R$^{30}$ to R$^{33}$ attached to a carbon atom positioned vicinal to each other respectively, form with the carbon atom to which they are attached a cycloalkenyl or aryl group optionally substituted by one or more substituents.

Most preferably, said first precatalyst may be of formula (IIa)

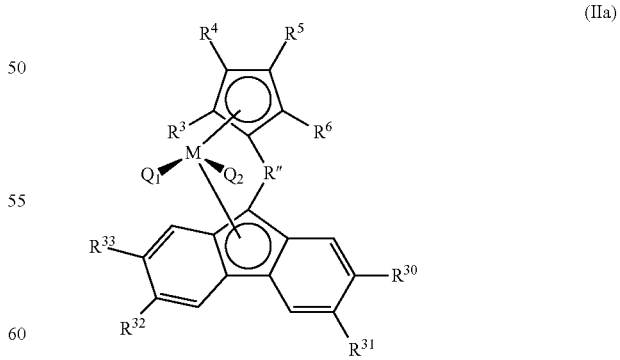

(IIa)

wherein
M is zirconium, hafnium or titanium; Q$^1$ and Q$^2$ are identical or different and are independently selected from the group consisting of amido, halogen, C$_1$-C$_{10}$ alkyl group, C$_6$-C$_{20}$ aryl group;

R" is of formula —[Z(R$^1$)(R$^2$)]$_n$— wherein n is 1 or 2, Z is a carbon or silicon, and R$^1$ and R$^2$ are identical or different and are independently selected from the group consisting of hydrogen, C$_1$-C$_6$ alkyl groups, C$_1$-C$_6$ alkenyl, phenyl group optionally substituted by one or more substituents, R$^3$ to R$^6$ and R$^{30}$ to R$^{33}$ are identical or different and are independently selected from the group consisting of hydrogen, C$_1$-C$_{10}$ alkyl groups optionally substituted by one or more substituents. C$_1$-C$_{10}$ alkenyl groups optionally substituted by one or more substituents, C$_6$-C$_{18}$ aryl groups optionally substituted by one or more substituents, or two of the substituents R$^3$ to R$^6$ and R$^{30}$ to R$^{33}$ attached to a carbon atom positioned vicinal to each other respectively, form with the carbon atom to which they are attached a cycloalkenyl or aryl group optionally substituted by one or more substituents.

In particular, said first precatalyst is of formula (III)

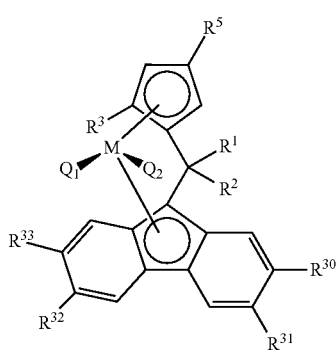

(III)

wherein

M is zirconium, hafnium or titanium; Q$^1$ and Q$^2$ are identical or different and are independently selected from the group consisting of amido, halogen, C$_1$-C$_{10}$ alkyl group, C$_6$-C$_{12}$ aryl group;

R$^1$ is hydrogen, C$_1$-C$_6$ alkyl groups, phenyl group optionally substituted by one or more substituents, R$^2$, R$^3$, R$^5$, are each, independently from one another, hydrogen. C$_1$-C$_{30}$ alkyl groups optionally substituted by one or more substituents. C$_6$-C$_{40}$ aryl groups optionally substituted by one or more substituents, R$^{30}$, R$^{31}$, R$^{32}$, R$^{33}$ are each, independently from one another, hydrogen. C$_1$-C$_{30}$ alkyl groups optionally substituted by one or more substituents. C$_1$-C$_{30}$ alkenyl groups optionally substituted by one or more substituents. C$_6$-C$_{40}$ aryl groups optionally substituted by one or more substituents, or R$^{30}$ and R$^{31}$ or R$^{32}$ and R$^{33}$ form with the carbon atom to which they are attached a cycloalkenyl or aryl group optionally substituted by one or more substituents.

More particularly, said first precatalyst may be of formula (III)

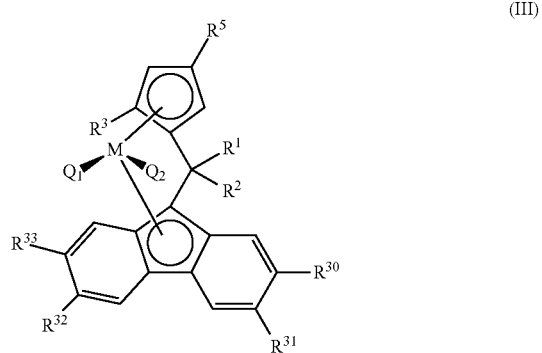

(III)

wherein

M is zirconium, hafnium or titanium; Q$^1$ and Q$^2$ are identical and are halogen.

R$^1$ is hydrogen. C$_1$-C$_6$ alkyl groups or phenyl group optionally substituted by one or more substituents, preferably hydrogen;

R$^2$ is C$_1$-C$_6$ alkyl groups optionally substituted by one or more substituents, C$_6$-C$_{18}$ aryl groups optionally substituted by one or more substituents, preferably phenyl group optionally substituted by one or more substituents;

R$^3$, R$^5$, are each, independently from one another, hydrogen, C$_1$-C$_6$ alkyl groups optionally substituted by one or more substituents. C$_6$-C$_{12}$ aryl groups optionally substituted by one or more substituents; preferably R$^3$, R$^5$, are each, independently from one another, C$_1$-C$_6$ alkyl groups or C$_6$-C$_{12}$ aryl groups;

R$^{30}$, R$^{31}$, R$^{32}$, R$^{33}$ are each, independently from one another, hydrogen, C$_1$-C$_6$ alkyl groups optionally substituted by one or more substituents, C$_6$-C$_{12}$ aryl groups optionally substituted by one or more substituents, or R$^{30}$ and R$^{31}$ or R$^{32}$ and R$^{33}$ form with the carbon atom to which they are attached a cycloalkenyl group optionally substituted by one or more substituents.

Most particularly, said first precatalyst may be selected from the group consisting of:

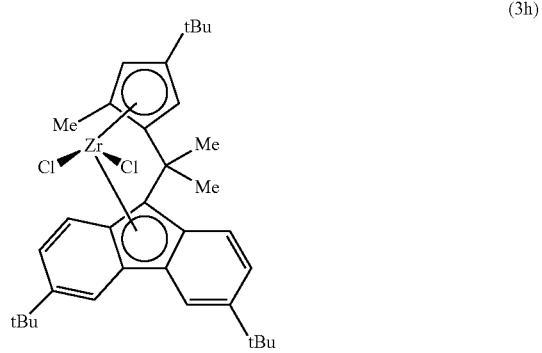

(3h)

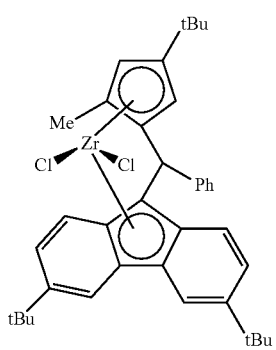
(3i)
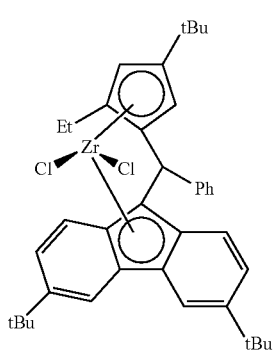
(3b)
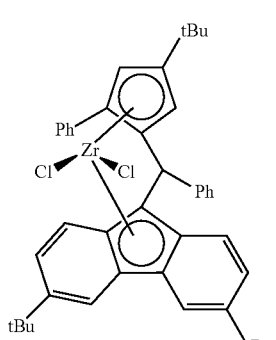
(3c)
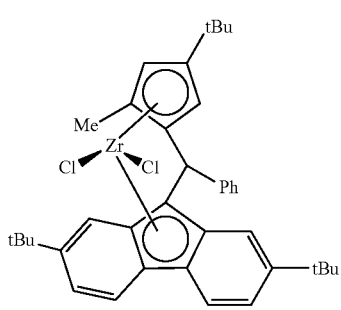
(3d)
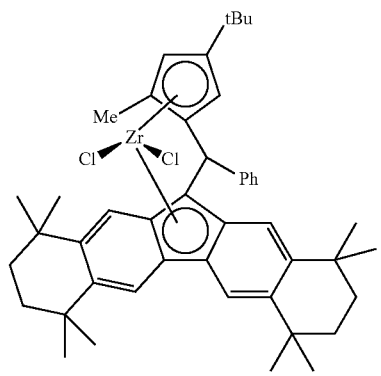
(3e)
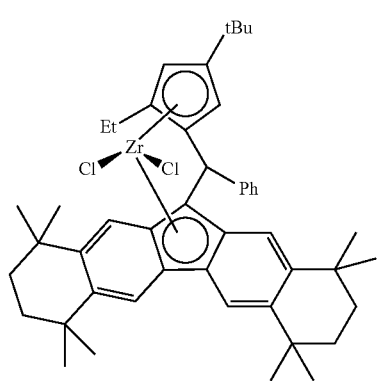
(3f)
Said second precatalyst is different from said first precatalyst. Said second precatalyst, when activated, or said second active catalyst system may be capable of incorporating a vinyl-terminal and/or vinylidene-terminal macromers in a polypropylene chain.
In a preferred embodiment, said second precatalyst may be of formula (IIa-c)
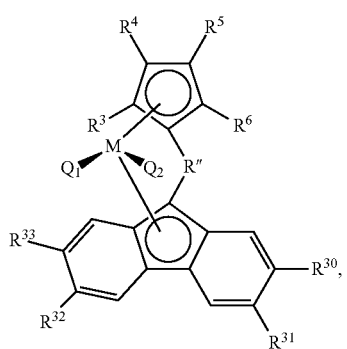
(IIa)

-continued (IIb)

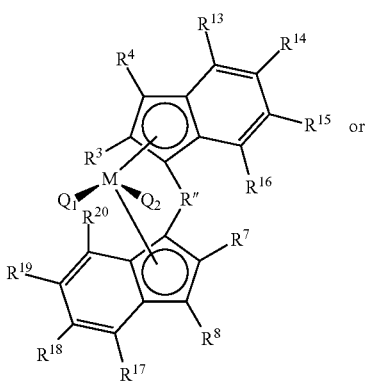

(IIc)

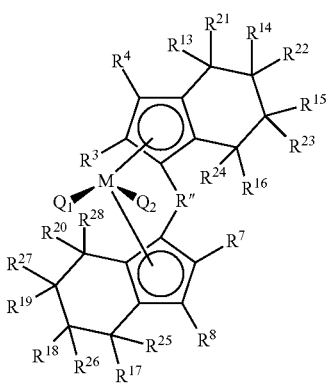

wherein

M is a group IV transition metal;

$Q^1$ and $Q^2$ are identical or different and are independently selected from the group consisting of amido, halogen, $C_1$-$C_{10}$ alkyl group, $C_6$-$C_{20}$ aryl group, an anionic ligand or a neutral ligand capable of coordination by a lone pair of electrons;

R" is of formula —$[Z(R^1)(R^2)]_n$— n is an integer between 1 and 5;

Z is a carbon or silicon;

$R^1$ and $R^2$ are identical or different and are independently selected from the group consisting of hydrogen. $C_1$-$C_{30}$ alkyl groups optionally substituted by one or more substituents. $C_1$-$C_{30}$ alkenyl groups optionally substituted by one or more substituents, $C_6$-$C_{40}$ aryl groups optionally substituted by one or more substituents, or $R^1$ and $R^2$ together with the atom Z to which they are attached form a three- to thirty-membered ring optionally substituted by one or more substituents;

$R^3$ to $R^8$, $R^{13}$ to $R^{28}$ and $R^{30}$ to $R^{33}$ are identical or different and are independently selected from the group consisting of hydrogen. $C_1$-$C_{30}$ alkyl groups optionally substituted by one or more substituents, $C_6$-$C_{40}$ aryl groups optionally substituted by one or more substituents, or two of the substituents $R^3$ to $R^8$, $R^{13}$ to $R^{23}$ and $R^{30}$ to $R^{33}$ attached to a carbon atom positioned vicinal to each other respectively, form with the carbon atom to which they are attached a cycloalkenyl or aryl group optionally substituted by one or more substituents.

Preferably, said second precatalyst may be of formula (IIa) or (IIb)

(IIa)

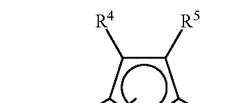

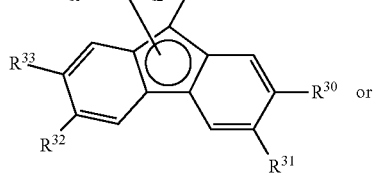

or (IIb)

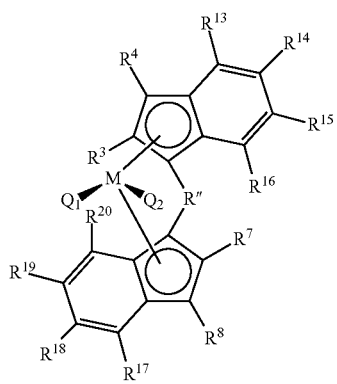

wherein

M is a group IV transition metal;

$Q^1$ and $Q^2$ are identical or different and are independently selected from the group consisting of amido, halogen, $C_1$-$C_{10}$ alkyl group, $C_6$-$C_{20}$ aryl group;

R" is of formula —$[Z(R^1)(R^2)]_n$— n is an integer between 1 and 3;

Z is a carbon or silicon;

$R^1$ and $R^2$ are identical or different and are independently selected from the group consisting of hydrogen. $C_1$-$C_{10}$ alkyl groups optionally substituted by one or more substituents. $C_1$-$C_{10}$ alkenyl groups optionally substituted by one or more substituents, $C_6$-$C_{12}$ aryl groups optionally substituted by one or more substituents;

$R^3$ to $R^8$, $R^{13}$ to $R^{20}$ and $R^{30}$ to $R^{33}$ are identical or different and are independently selected from the group consisting of hydrogen. $C_1$-$C_{30}$ alkyl groups optionally substituted by one or more substituents, $C_6$-$C_{40}$ aryl groups optionally substituted by one or more substituents, or two of the substituents $R^3$ to $R^8$, $R^{13}$ to $R^{20}$ and $R^{30}$ to $R^{33}$ attached to a carbon atom positioned vicinal to each other respectively, form with the carbon atom to which they are attached a cycloalkenyl or aryl group optionally substituted by one or more substituents.

More preferably, said second precatalyst may be of formula (IIa) or (IIb)

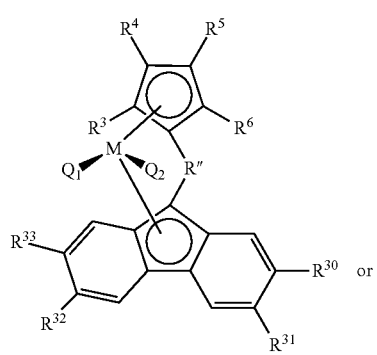
(IIa)

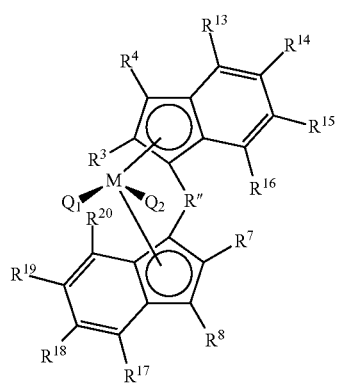
(IIb)

wherein

M is zirconium, hafnium or titanium; $Q^1$ and $Q^2$ are halogen; R" is of formula —$[Z(R^1)(R^2)]_n$— wherein n is 1 or 2, Z is a carbon or silicon, and $R^1$ and $R^2$ are identical or different and are independently selected from the group consisting of hydrogen. $C_1$-$C_6$ alkyl groups. $C_1$-$C_6$ alkenyl groups, phenyl group optionally substituted by one or more substituents, preferably $R^1$ and $R^2$ are identical or different and are independently selected from the group consisting of hydrogen, methyl, ethyl and phenyl group optionally substituted by one or more substituents, $R^3$ to $R^8$, $R^{13}$ to $R^{20}$ and $R^{30}$ to $R^{33}$ are identical or different and are independently selected from the group consisting of hydrogen. $C_1$-$C_{10}$ alkyl groups optionally substituted by one or more substituents, $C_6$-$C_{12}$ aryl groups optionally substituted by one or more substituents, or two of the substituents $R^3$ to $R^8$, $R^{13}$ to $R^{20}$ and $R^{30}$ to $R^{33}$ attached to a carbon atom positioned vicinal to each other respectively, form with the carbon atom to which they are attached a cycloalkenyl optionally substituted by one or more substituents.

More preferably, said second precatalyst is of formula (III) or (IV)

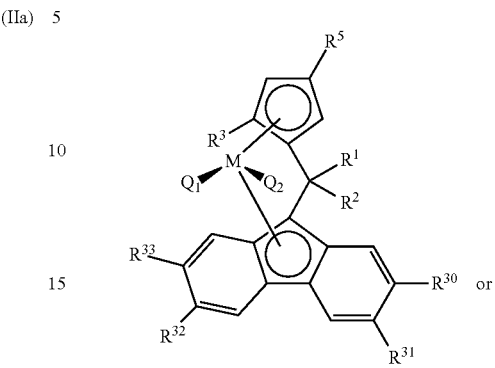
(III)

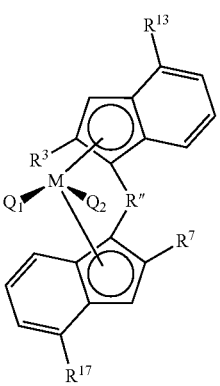
(IV)

wherein

M is zirconium, hafnium or titanium; $Q^1$ and $Q^2$ are halogen; R" is of formula —$[Z(R^1)(R^2)]_n$— wherein n is 1 or 2, Z is a carbon or silicon, and $R^1$ and $R^2$ are identical or different and are independently selected from the group consisting of hydrogen. $C_1$-$C_6$ alkyl groups. $C_1$-$C_6$ alkenyl groups, phenyl group optionally substituted by one or more substituents, preferably $R^1$ and $R^2$ are identical or different and are independently selected from the group consisting of hydrogen, methyl, ethyl and phenyl group optionally substituted by one or more substituents;

$R^3$, $R^5$, $R^7$, $R^{13}$, $R^{17}$ and $R^{30}$ to $R^{33}$ are identical or different and are independently selected from the group consisting of hydrogen. $C_1$-$C_{10}$ alkyl groups optionally substituted by one or more substituents, $C_6$-$C_{18}$ aryl groups optionally substituted by one or more substituents, or two of the substituents $R^{30}$ to $R^{33}$ attached to a carbon atom positioned vicinal to each other respectively, form with the carbon atom to which they are attached a cycloalkenyl optionally substituted by one or more substituents.

In particular, said second precatalyst, being different from said first precatalyst, may be selected from the group consisting of:

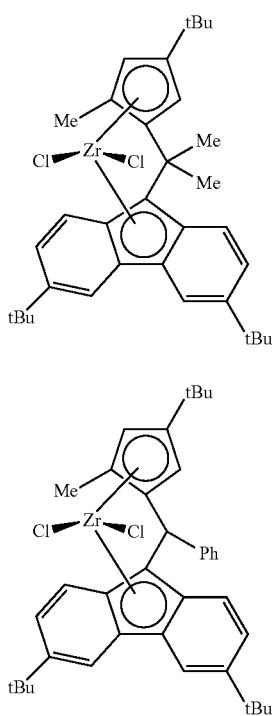
(3h)
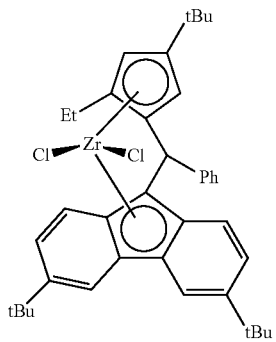
(3i)
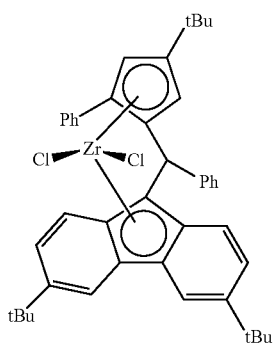
(3b)
(3c)
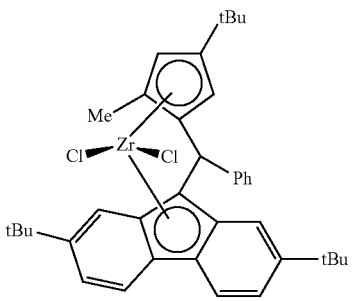
(3d)
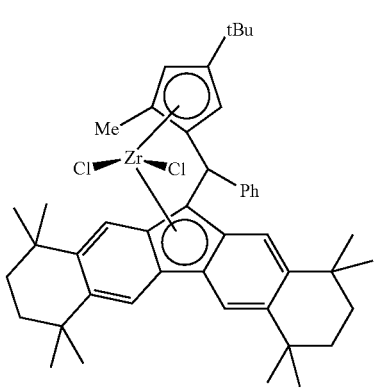
(3e)
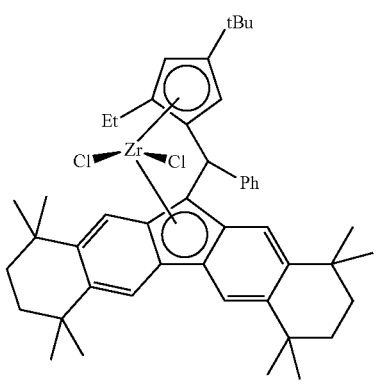
(3f)
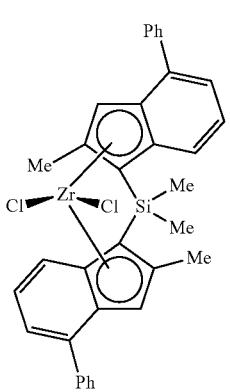
(3j)

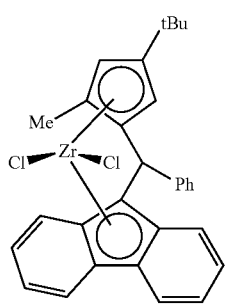

(3a)

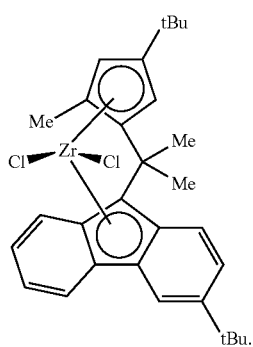

(3g)

First and second precatalysts could be selected from the same families but they must be different. As mentioned above, the first precatalyst will be selected for its macromer production aptitude whereas the second one will be selected for its macromer incorporation aptitude.

In the present process, the first and second precatalysts may be introduced in the reactor either simultaneously or sequentially.

In a preferred embodiment, step (c) is carried out sequentially after step (b) without isolation of the product formed in step (b), preferably step (c) is carried out at least 10 minutes after step (b), more preferably at least 20 minutes after step (b), most preferably at least 30 minutes after step (b).

In another preferred embodiment, steps (a) to (c) are carried out simultaneously by injecting or providing said first and second active catalyst systems into the reactor. Hence, the present process may comprise the steps of providing in a reactor said first and second active catalyst systems as defined above, contacting them with propylene, maintaining under polymerization conditions and retrieving a polypropylene having long chain branching. Said first and second active catalyst systems may also be prepared in situ. Hence, the present process may comprise the steps of providing in a reactor said first and second precatalysts as defined above with the proviso than said second precatalyst is different from said first precatalyst, contacting said first and second precatalyst with propylene in presence of an activating agent having an alkylating and/or ionizing action, maintaining under polymerization conditions and retrieving a polypropylene having long chain branching.

Said first active catalyst system may be contacted with propylene at a temperature at which polypropylene macromers having vinyl- or vinylidene-terminated chains can be produced therewith. Preferably, said first active catalyst system may be contacted with propylene at temperature of at least 40° C., more preferably of at least 60° C., most preferably of at least 80° C., In particular, said first precatalyst may be contacted with propylene at temperature ranging from 40° C. to 100° C., preferably from 50° C. to 90° C., more preferably from 60° to 80° C.

The weight ratio between the first precatalyst and the second precatalyst, or between the first active catalyst system and the second active catalyst system, is of 1/2 to 100/1, preferably of 1/1 to 50/1, more preferably of 2/1 to 15/1, most preferably of 5/1 to 10/1.

In a preferred embodiment, the activating agent is selected from alkyl aluminium, alumoxanes and boron-containing compounds. The activating agent used to prepare said first active catalyst system may be the same or different from the activating agent used to prepare said second active catalyst system.

The activating agent can be an alkyl aluminium represented by formula $AlR^*_nX_{3-n}$ wherein $R^*$ is an alkyl having from 1 to 20 carbon atoms, n is an integer between 0 and 3 and X is a halogen. The preferred alkyl aluminium may be triisobutylaluminum (TIBAL) or triethylaluminium (TEAL). The alkyl aluminium can be used in combination with a perfluoroborate e.g. $[Ph_3C][B(C_6F_5)_4]$ or $[Me_2NPhH][B(C_6F_5)_4]$. For example, using a combination of $[Ph_3C][B(C_6F_5)_4]$/TIBAL or of $[Me_2NPhH][B(C_6F_5)_4]$/TIBAL.

Suitable boron-containing agents may also be used for activating the metallocene compound to form a precatalyst system. These include for example a triphenylcarbenium boronate such as tetrakis(pentafluorophenyl)borato-triphenylcarbenium as described in EP-A-0427696, or those of the general formula $[L'-H]^+[BAr^1Ar^2X^3X^4]^-$— as described in EP-A-0277004 (page 6, line 30 to page 7, line 7). The amount of boron-containing activating agent is selected to give a B/M ratio of from 0.5 to 5, preferably of about 1.

The activating agent may be an aluminoxane and may comprise oligomeric linear and/or cyclic alkyl aluminoxanes represented by formula

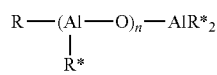

for oligomeric, linear aluminoxanes and by formula

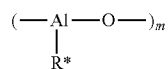

for oligomeric, cyclic aluminoxane, wherein n is 1-40, preferably 1-20, m is 3-40, preferably 3-20 and $R^*$ is a $C_1$-$C_8$ alkyl group and preferably methyl or isobutyl. Preferably, the activating agent is selected from methylaluminoxane (MAO) and ethylaluminoxane. More preferably the activating agent is MAO. The amount of activating agent is selected to give an Al/M ratio of 10 to 10,000, preferably 100 to 10,000, more preferably of 200 to 4,000, even more preferably from 500 to 3,000, most preferably from to 1,000 to 3,000. The amount of activating agent depends upon its nature.

The catalyst system may comprise a scavenger that may be selected from the group consisting of alkyl aluminium represented by formula $AlR^*_nX_{3-n}$ wherein $R^*$ is an alkyl having from 1 to 20 carbon atoms, n is an integer between 0 and 3 and X is a halogen; or aluminoxane. Said scavenger may be, for example, triethylaluminium, triisobutylaluminum, tris-n-octylaluminum, tetraisobutyldialuminoxane, diethylzinc, tris-n-hexyl aluminium, diethylchloroaluminum or MAO. Usually, the scavenger is added after activation of the precatalyst with the activating agent. Preferably, the scavenger is different from the activating agent.

In another embodiment, the catalyst system according to the invention further comprises an inorganic support. The inorganic support may comprise talc, inorganic oxides, clays and clay minerals, ion-exchanged layered compounds, diatomaceous earth compounds, zeolites or a resinous support material, such as a polyolefin, for example. Specific inorganic oxides include silica, alumina, magnesia, titania and zirconia, for example. Preferably, the inorganic support may comprise silica and/or alumina. The inorganic support may comprise from 10 to 100 wt % of silica and/or preferably from 10 to 100 wt % of alumina.

Alternatively, the inorganic support may also be an activating support such as fluorinated alumina silica. Methods for preparing such inorganic supports are described WO 2007/127465 or WO2005/075525.

Preferably, the inorganic support is pre-impregnated with MAO before adding the metallocene compound.

The pressure in the reactor can vary from 0.5 to 50 bars, i.e. from $5 \cdot 10^4$ Pa to $5 \cdot 10^6$ Pa, preferably from 5 to 25 bars, i.e. from $5 \cdot 10^5$ Pa to $2.5 \cdot 10^6$ Pa.

Optionally hydrogen can be added to control the molecular weight of the polypropylene. Also optionally, an antifouling agent can be added to the reactor.

The polymerisation process can be carried out in solution, in slurry or in gas phase. In a slurry process, the first and/or second precatalysts or the first and/or second active catalyst systems are preferably supported. The slurry process can be carried out in a reactor suitable for such processes, such as continuously stirred tank reactors (CSTRs) or slurry loop reactors (in particular liquid full loop reactors).

Two or more reactors may be connected in series in order to produce bimodal copolymers. The pressure in each reactor can vary from 0.5 to 50 bars i.e. from $5 \cdot 10^4$ Pa to $5 \cdot 10^8$ Pa, preferably 5 to 25 bars, i.e. from $5 \cdot 10^5$ Pa to $2.5 \cdot 10^6$ Pa, most preferably may be around 20 bars, i.e. $2.10^6$ Pa. The amount of hydrogen, the temperature or the content of propylene in the feed can be different in each reactor. Preferably, the active catalyst systems used in each reactor may be the same or different. The long chain branching content of the polypropylene produced in each reactor can be different as well as the molecular weight. Preferably, an overlap of the molecular weight distribution of polypropylene produced in each reactor is obtained. The molecular weight distribution may range from 1 to 7 for the polypropylene produced in each reactor, preferable from 1.5 to 4.0.

Long chain branched polypropylene can be obtained with the present process in the slurry, gas phase or solution phase, using a heterogeneous (supported) catalyst system or a homogeneous (unsupported) catalyst system. A diluent or solvent may be used in the present process. Said diluent or solvent may be a hydrocarbon, preferably a saturated hydrocarbon having from 4 to 12 carbon atoms, such as isobutane or hexane. Alternatively, said diluent or solvent may be unsaturated hydrocarbon such as toluene.

In a second aspect of the present invention, a long chain branched polypropylene is provided. As already disclosed by Weng et al., a first type of the long chain branched polypropylene has $^{13}$C NMR signals at δ 44.88, 44.74, 44.08 and 31.74 ppm. According to the present invention, a second type of long chain branching is also incorporated in the long chain branched polypropylene which has one or more of the following $^{13}$C NMR signals: δ 51.1, 49.0, 38.9, 27.1, 26.6, 24.0, 233, 23.0, 22.9 or 19.8 ppm. In a preferred embodiment, the long chain branched polypropylene may have two, three, four, five, six, seven, eight, nine or ten of the following $^{13}$C NMR signals: δ 51.1, 49.0, 38.9, 27.1, 26.6, 24.0, 23.3, 23.0, 22.9 or 19.8 ppm. In particular, the long chain branched polypropylene has $^{13}$C NMR signals at δ 19.8, 22.9, 23.0, 23.3, 24.0, 26.6, 27.1, 31.74, 38.9, 44.08, 44.74, 44.88, 49.0 and 51.1 ppm.

The long chain branched polypropylene may be isotactic or syndiotactic. The tacticity of the said long chain branched polypropylene may be controlled by the first and/or second active catalyst systems used in the process according to the present invention. As the second active catalyst systems are the ones which make the polypropylene backbone, the tacticity of the said long chain branched polypropylene may be preferably controlled by said second active catalyst systems. Preferably, the long chain branched polypropylene may be isotactic when the second active catalyst system comprises a second precatalyst of formula (3a), (3b), (3c), (3d), (3e), (3f), (3g), (3h), (3i) or (3j). The tacticity of the long chain branched polypropylene may be further increased by providing isotactic long chain branching, e.g. isotactic polypropylene macromers, for example by using a first active catalyst system comprising a first precatalyst of formula (III) as defined above wherein $R^3$ and $R^5$ are not simultaneously hydrogen. The tacticity of the said long chain branched polypropylene may be at least 70% mmmm, preferably at least 80% mmmm. In particular, the tacticity of the said long chain branched polypropylene may range from 80% to 95% mmmm. Alternatively, the long chain branched polypropylene may be syndiotactic. The tacticity of the said long chain branched polypropylene may be at least 70% rrrr, preferably at least 80% rrrr. In particular, the tacticity of the said long chain branched polypropylene may range from 80% to 95% rrrr. A syndiotactic long branched polypropylene may be obtained with a second active catalyst system comprising a second precatalyst such as for example a precatalyst of formula (III) wherein $R^3$ and $R^5$ are hydrogen. The tacticity of the long chain branched polypropylene may be further increased by providing syndiotactic long chain branchings, e.g. syndiotactic polypropylene macromers, for example by using a first active catalyst system comprising a first precatalyst of formula (III) as defined above wherein $R^3$ and $R^5$ are not simultaneously hydrogen with the proviso that the first and second precatalysts are different.

The long chain branched polypropylene obtained at the end of the present process may have molecular weight Mn of at least 20,000 g·mol$^{-1}$, preferably ranging from 30,000 to 1,000,000 g·mol$^{-1}$, preferably from 30,000 to 750,000 g·mol$^{-1}$, more preferably from 30,000 to 500,000 g·mol$^{-1}$. The long chain branched polypropylene according to the present invention incorporates propylene macromers, preferably having Mn greater than 6,000 g·mol$^{-1}$, more preferably greater than 7,000 g·mol$^{-1}$.

The long chain branched polypropylene may have polydispersity Mw/Mn ranging from 1.0 to 20.0, preferably from 1.5 to 5.0, more preferably from 2.0 to 4.0 determined as disclosed in the tests methods.

The long chain branched polypropylene according to the present invention may also have melting temperature of at least 115 C, preferably 135° C., more preferably at least 140° C.

The long chain branching polypropylene have excellent melt strength behavior. The use of first and second active catalyst system comprising said first and second precatalysts respectively according to the present process allows the long chain branched polypropylene having more significant rheological linear viscoelastic deviations from the linear case. The long chain branched polypropylene according to the present invention may have a loss angle, δ, evolution as a function of complex modulus G* comprising a portion which increases with the complex modulus in the range of G* greater than 300 Pa, preferably 500 Pa, more preferably 1,000 Pa, even more preferably greater than 5,000 Pa.

In particular, a long chain branched polypropylene having loss angle, δ, lower than 70°, preferably lower than 60°, more preferably lower than 55°, at complex modulus G* ranging from 1000 Pa to 10,000 Pa.

The branching of said polypropylene, typically the chains produced during polymerization induced by the first pre-catalyst, according to the present invention may have a molecular weight Mn of at least 6,000 g·mol$^{-1}$, preferably at least 7,000 g·mol$^{-1}$, more preferably at least 8,000 g·mol$^{-1}$. Said branching may have at least 420 carbon atoms, preferably at least 500 carbon atoms, more preferably at least 600 carbon atoms.

The long chain branched polypropylene has at least two different types of long chain branching as suggested by the $^{13}$C NMR spectrum. A first type of long chain branchings are similar to the long chain branchings disclosed by Weng et al., Such type of branchings is characterized by signals in $^{13}$C NMR spectrum at δ 44.88, 44.74, 44.08 and 31.74 ppm. The content of long chain branchings in the polypropylene according to this first type of long chain branchings may be greater than 0.2 per 10,000 C. preferably greater than 0.3 per 10,000 C. more preferably greater than 0.5 per 10,000 C. The second type of long chain branching which has never been disclosed before in the prior art is characterized by new $^{13}$C NMR signals as described above. The content of long chain branchings in the polypropylene according to this second type of long chain branchings may be greater than 0.2 per 10,000 C, preferably greater than 0.3 per 10,000 C. more preferably greater than 0.5 per 10,000 C. The total content of long chain branchings (i.e. first type+second type of long chain branchings as disclosed herein) of the polypropylene according to the present invention may be greater than 0.2 per 10,000 C. preferably greater than 0.5 per 10,000 C. more preferably greater than 0.6 per 10,000 C. most preferably greater than 1.0 per 10,000 C. Hence, according to the present process, a new long chain branched polypropylene is produced having a new type of branchings which are different from the ones disclosed in the art.

In another aspect, the present invention relates to an article comprising polypropylene according to the present invention.

Test Methods

Molecular weights were determined by Size Exclusion Chromatography (SEC) at high temperature (145° C.). A 10 mg polymer sample was dissolved at 160° C. in 10 mL of trichlorobenzene (technical grade) for 1 hour. Analytical conditions for the CPVIR5 from PolymerChar were:

Injection volume: +/−400 µL
Automatic sample preparation and injector temperature: 160° C.
Column temperature: 145° C.
Detector temperature: 160° C.
Column set: 2 Shodex AT-806MS and 1 Styragel HT6E
Flow rate: 1 ml/min
Detector: Infrared detector (2,800-3,000 cm$^{-1}$)
Calibration Narrow standards of polystyrene (commercially available)
Calculation for polypropylene: Based on Mark-Houwink relation ($\log_{10}(M_{PP})=\log_{10}(Mps)-0.25323$); cut off on the low molecular weight end at $M_{PP}$=1000.

The molecular weight distribution (MWD) or polydispersity (P) was then calculated as $M_w/M_n$.

Melting temperatures $T_{melt}$ and crystallization temperatures $T_{cryst}$ were determined according to ISO 3146 on a DSC Q2000 instrument by TA Instruments. To erase the thermal history, the samples were first heated to 200° C. and kept at 200° C. for a period of 3 minutes. The reported melting temperatures $T_{melt}$ and $T_{cryst}$ were then determined with heating and cooling rates of 20° C./min.

The $^{13}$C NMR analysis was performed at an operative frequency of 125 MHz using a 500 MHz Bruker NMR spectrometer with a high temperature 10 mm cryoprobe under conditions such that the signal intensity in the spectrum is directly proportional to the total number of contributing carbon atoms in the sample. Such conditions are well known to the skilled person and include for example sufficient relaxation time etc. In practice, the intensity of a signal is obtained from its integral, i.e. the corresponding area. The data were acquired using proton decoupling, 240 scans per spectrum, a pulse repetition delay of 11 seconds and a spectral width of 26,000 Hz at a temperature of 130° C. The sample was prepared by dissolving a sufficient amount of polymer in 1,2,4-trichlorobenzene (TCB, 99%, spectroscopic grade) at 130° C. and occasional agitation to homogenize the sample, followed by the addition of hexadeuterobenzene ($C_6D_6$, spectroscopic grade) and a minor amount of hexamethyldisiloxane (HMDS, 99.5+ %), with HMDS serving as internal standard. To give an example, about 200 mg of polymer were dissolved in 2.0 mL of TCB, followed by addition of 0.5 mL of $C_6D_6$ and 2 to 3 drops of HMDS. Prior to Fournier Transform, Lorentz-Gauss transformation (Lb=−0.2, Gb=0.02) is applied to improve sensitivity and resolution. The chemical shifts are referenced to the signal of the internal standard HMDS, which is assigned a value of δ 2.03 ppm.

The long chain branching content of the first type of branching as disclosed by Weng et al. (per 10,000 carbon atoms) is determined from CH (at δ 31.8 ppm) area divided by the sum of all peaks area, multiplied by 10,000. The long chain branching content of the second type of branching according to the present invention (per 10,000 carbon atoms) is determined from average of additional peaks (newly observed and disclosed above) area divided by the sum of all peaks area, multiplied by 10,000.

The isotacticity was determined by $^{13}$C NMR analysis on the total polymer. In the spectral region of the methyl groups, the signals corresponding to the pentads mmmm, mmmr, rmmr, mmrr, rmrr+mrmm, mrmr, rrrr, mrrr and mrrm were assigned using published data, for example A. Razavi, Macromol. Symp., 1995, vol. 89, pages 345-367. Some area corrections were performed in case of overlap with signals related to 2,1-insertions, 1,3-additions, n-propyl chain ends, etc. The percentage of mmmm pentads was then calculated by normalization of all the methyl pentads area according to % $mmmm=AREA_{mmmm}/(AREA_{mmmm}+AREA_{mmmr}+AREA_{mmrr}+AREA_{mmm})*100$.

The $^{13}$C NMR detection limit in these conditions is about 0.6/10,000 C.

G' (storage modulus) and G" (loss modulus) were measured at a temperature of 230° C. using a dynamic rheometer in a frequency sweep with a strain of 20% on an ARES-G2 instrument from TA, branch of WATERS.

EXAMPLES

The comparative example is carried out in presence of a single precatalyst. The polymerization tests are carried out in a 300 mL high-pressure glass reactor equipped with a mechanical stirrer (Pelton turbine) and externally heated with a double mantle with a thermostated circulating water bath. The reactor was charged with toluene (150 mL) and MAO (1.5 mL of a 30 wt % solution in toluene, Albemarle), and propylene (5 bar, Air Liquide, 99.99%) was introduced. The reactor was thermally equilibrated at the desired temperature (60° C.) for 30 min. Propylene pressure was decreased to 1 bar, and a solution of the precatalyst, for example [PhCH-(3,6-tBu$_2$-Flu)(3-tBu-5-Et-Cp)]ZrCl$_2$ (3b) (1.0 mg) in toluene (ca. 2 mL) was added by syringe. The propylene pressure was immediately increased to 5 bar (and then kept constant with a back regulator throughout the polymerization reaction) and the solution was stirred for the desired time (30 min). The temperature in the reactor was monitored using a thermocouple. The polymerization was stopped by venting the vessel ad quenching with a 10 wt % solution of aqueous HCl in methanol (ca, 3 mL). The polymer was precipitated in methanol (ca. 200 mL) and 35 wt % aqueous HCl (ca. 1 mL) was added to dissolve possible precatalyst residues. The polymer was collected by filtration, washed with methanol (ca. 200 mL), and dried under vacuum overnight.

aqueous HCl (ca. 1 mL) was added to dissolve possible catalyst residues. The polymer was collected by filtration, washed with methanol (ca. 200 mL), and dried under vacuum overnight. Extraction of the oligomeric fractions was performed using n-hexane in a Kumagawa reactor. The insoluble fraction properties were analyzed by rheological methods. The present process may also be carried out by introducing in the reactor the two precatalysts simultaneously.

The advantages of the present invention are illustrated by the following representative examples. Table 1 reports experimental conditions of comparative and inventive examples wherein precatalysts 3j, 3b, 3c and 3f as defined above were used. Table 1 also reports physical properties of the polypropylene obtained therewith. It is clearly demonstrated that the use of two precatalysts allows the formation of a polypropylene having long chain branchings while the process carried out in presence of only one precatalyst does not lead to the formation of a long chain branched polypropylene.

TABLE 1

| 1$^{st}$/2$^{nd}$ catalyst | Zr$_1$/Zr$_2$ [μmol · L$^{-1}$] | Al/Zr$_1$ & AL/Zr$_2$ [μmol · L$^{-1}$] | Tpoly (° C.) | Prod$_1$. [g$_{pp}$ · g$_{cat}^{-1}$] | Prod$_2$. [g$_{pp}$ · g$_{cat}^{-1}$] | Mn$^a$ [kg · mol$^{-1}$] | M$_w$/M$_n$ | T$_m$ (° C.) | Tacticity$^b$ [m$^4$] (%) | LCB$^c$ [/10,000 C] |
|---|---|---|---|---|---|---|---|---|---|---|
| 3c | 97 | 2000 | 80 | 900 | — | 6.1 | 1.6 | — | 19.4 | 0 |
| 3j | 2.9 | 15500 | 60 | — | 90,100 | 41.2 | 2.1 | 155 | 97.7 | 0 |
| 3c/3j | 89/4 | 1040/22350 | 80/60 | 760 | 68,850 | 26.4 | 2.3 | 143 | 85.3 | 5.6 |
| 3c/3j | 49/4 | 1110/14460 | 80/60 | 600 | 61,570 | nd | nd | 144 | nd | nd |
| 3b | 10 | 5000 | 60 | — | 11,430 | 62.5 | 2.0 | 148 | 92.2 | 0 |
| 3c/3b | 95/12 | 1900/15250 | 80/60 | 1,370 | 6,640 | 28.6 | 1.9 | 140 | 76.3 | nd |
| 3c/3b | 95/12 | 1310/10170 | 60/60 | 1,540 | 1,850 | 32.5 | 2.4 | 142 | 81.2 | 0.9 |
| 3c/3b | 33/10 | 1810/6120 | 80/80 | 1,860 | 7,120 | 31.6 | 2.5 | 142 | 80.7 | 0.9 |
| 3f | 8 | 5000 | 60 | — | 16,700 | 61.3 | 2.3 | 152 | 94.1 | 0 |
| 3c/3f | 91/8 | 1190/10630 | 80/60 | 1,130 | 6,280 | nd | nd | 144 | 82.0 | 0.9 |
| 3c/3f | 98/10 | 430/380 | 90/60 | 620 | 3,640 | nd | nd | 145 | nd | nd | n.d. = not determined
*Both catalyst were charged simultaneously;
$^a$determined by GPC;
$^b$determined by $^{13}$C NMR;
$^c$determined by 13C NMR and corresponding to the long chain branching content of branching as disclosed by Weng et al.

| Run | 1 (comp.) | 2 (comp.) | 3 (Inv.) | 4 (Inv.) | 5 (comp.) | 6 (Inv.) | 7 (Inv.) | 8* (Inv.) | 9 (comp.) | 10 (Inv.) | 11 (Inv.) |
|---|---|---|---|---|---|---|---|---|---|---|---|

Inventive example according to the process of the present invention was carried out in the same reactor as in comparative example. The reactor was charged with toluene (150 mL) and MAO (1.5 mL of a 30 wt % solution in toluene, Albemarle), and propylene (5 bar, Air Liquide, 99.99%) was introduced. The reactor was thermally equilibrated at the desired temperature (80° C.) for 30 min before decreasing the propylene pressure to 1 bar. A solution of the first precatalyst, for example [PhCH-(3,6-tBu$_2$-Flu)(3-tBu-5-Ph-Cp)]ZrCl$_2$ (3c) (10 mg) in toluene (3 mL) was added by syringe. The propylene pressure was set to 5 bar. After 30 min reaction, the reactor was cooled to 60° C. and vented before adding a solution of the second precatalyst, for example [PhCH-(3,6-tBu$_2$-Flu)(3-tBu-5-Et-Cp)]ZrCl$_2$ (3b) (1.0 mg) in toluene (ca. 1 mL). The propylene pressure was increased to 5 bar and the solution was stirred for 30 additional min before venting the reactor, quenching the reaction (3 mL of a 10 wt % solution of aqueous HCl in methanol) and cooling the reactor to 25° C. The polymer was precipitated in methanol (ca. 200 mL) and 35 wt %

It is noted that the $^{13}$C{$^1$H} NMR spectrum of polypropylene obtained in run 5 (precatalyst 3b) did not show any resonance at δ 44.88, 44.74, 44.08 and 31.74 ppm described in Weng et al. (Macromolecules 2002, 35, 3838-3843) as characteristics of long chain branched isotactic polypropylene. This is not the case for the polypropylenes prepared according to the present invention, with two catalyst systems, for which the $^{13}$C{$^1$H} NMR spectra show clear resonances at δ 44.88, 44.74, 44.08 and 31.74 ppm.

According to the present of the present invention, long chain branchings are obtained. It is, however, unexpected that a second type of branchings, having specific $^{13}$C NMR signals, was also obtained. Table 2 reports the content of both first and second type of branchings in the polypropylene obtained according to the present invention.

TABLE 2

| Run | $1^{st}/2^{nd}$ precatalyst | LCB[a] [/10,000 C] | New LCB[b] [/10,000 C] | LCB total[c] [/10,000 C] |
|---|---|---|---|---|
| 3 | 3c/3j | 5.6 | 0.6 | 6.2 |
| 6 | 3c/3b | nd | 4.6 | ≥4.6 |
| 7 | 3c/3b | 0.9 | 5.4 | 6.3 |
| 8 | 3c/3b | 0.9 | 6.9 | 7.8 |
| 10 | 3c/3f | 0.9 | 4.3 | 5.2 | nd = not determined;
[a] content of long chain branching as disclosed by Weng et al.;
[b] content of second type of long chain branching as disclosed in the present invention;
[c] total long chain branching per 10,000 C = (content of first type of long chain branching as disclosed by Weng et al. + content of second type of long chain branching as disclosed in the present invention) both expressed/10,000 C.

The total content of long chain branchings of the polypropylene obtained according to the process of the present invention is higher than 5 per 10,000 C. This unexpected high long chain branching content provides interesting viscoelastic properties to the polypropylene obtained according to the present invention, FIG. 1a-c represent the $^{13}C\{^1H\}$ NMR spectrum of the polypropylene obtained according to runs 3, 8 and 10 respectively, i.e. in presence of precatalysts 3c/3h, 3c/3b and 3c/3f respectively. The signals corresponding to the first type of long chain branchings disclosed by Weng et al. are depicted by the white triangles (δ 44.88, 44.74, 44.08 and 31.74 ppm) while the new signals corresponding to the second type of long chain branchings are depicted by the black diamonds (δ 51.1, 49.0, 38.9, 27.1, 26.6, 24.0, 23.3, 23.0, 22.9 and 19.8 ppm).

Figure 2:
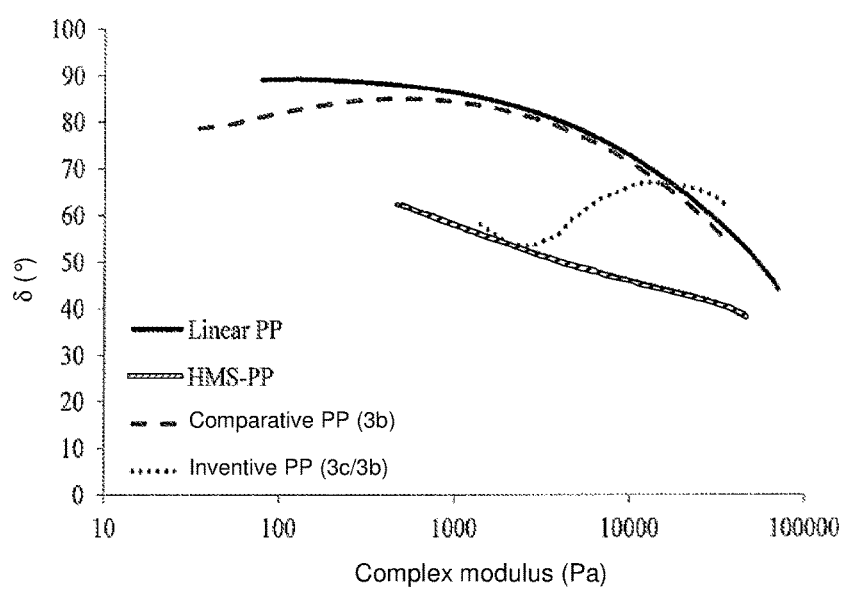
FIG. 2 represents the van Gurp-Palmen plot, i.e. the representation of the loss angle as a function of the complex modulus G*, of polypropylene according to the present invention and comparative polypropylenes.

The rheological properties of the polypropylene according to the present invention were also evaluated. FIG. 2 represents the van Gurp-Palmen plot (δ=f(G*)), i.e. the representation of the loss angle as a function of the complex modulus G*, of the polypropylene according to the present invention and comparative polypropylene. The curves were measured at T=190° C., and at shear rates ranging from 0.1 to 320 rad·s$^{-1}$. In FIG. 2, the thick solid line corresponds to a linear polypropylene (commercial name: MR2001 commercialized by Total), the hatched line corresponds to a high melt strength polypropylene (commercial name PF814 commercialized by Lyondel Basell), the dashed line corresponds to a comparative polypropylene prepared in presence of precatalyst (3b) and the dotted line corresponds to a long chain branched polypropylene according to the present invention prepared in the sequential presence of first and second precatalysts 3c and 3b. It is noted that the van Gurp-Palmen rheological curve of polypropylene according to the present invention shows a S-shaped evolution of the loss angle δ as a function of complex modulus G*, with a first decrease at low values of G* followed by an increase up to a maximum value of the loss angle at higher values of G*. Such S-shaped curve is quite distinct from any of the other continuously decreasing curves measured on the prior art polypropylenes.

Hence, the polypropylene according to the present invention has a new molecular architecture composed with two different types of long chain branchings, leading to an improvement of its elasticity properties compared to comparative polypropylene obtained with precatalyst 3b only. The polypropylene according to the present invention can be obtained by the process of the present invention combining first and second precatalysts or first and second active catalyst system as defined herein.

The terms and descriptions used herein are set forth by way of illustration only and are not meant as limitations. Those skilled in the art will recognize that many variations are possible within the spirit and scope of the invention as defined in the following claims, and their equivalents, in which all terms are to be understood in their broadest possible sense unless otherwise indicated. As a consequence, all modifications and alterations will occur to others upon reading and understanding the previous description of the invention. In particular, dimensions, materials, and other parameters, given in the above description may vary depending on the needs of the application.

The invention claimed is:

1. A process for the preparation of polypropylene having long chain branchings comprising the steps of:
(a) providing in a reactor a first active catalyst system comprising an activating agent having an alkylating and/or ionizing action and a first precatalyst of formula (I)

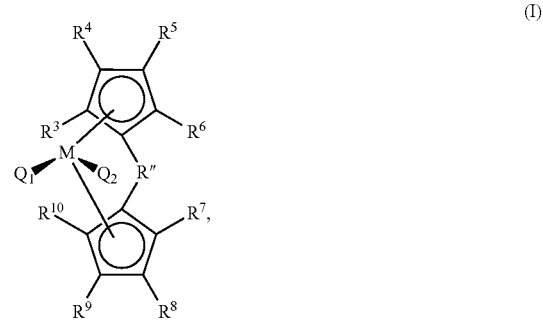

wherein M is a group IV transition metal;
wherein $Q_1$ and $Q_2$ are identical or different and are independently selected from the group consisting of amido, halogen, $C_1$-$C_{10}$ alkyl group, $C_6$-$C_{20}$ aryl group, an anionic ligand or a neutral ligand capable of coordination by a lone pair of electrons;
wherein R" is of formula —$[Z(R^1)(R^2)]_n$—
wherein n is an integer between 1 and 5;
wherein Z is a carbon or silicon;
wherein $R^1$ and $R^2$ are identical or different and are independently selected from the group consisting of hydrogen, $C_1$-$C_{30}$ alkyl groups optionally substituted by one or more substituents, $C_1$-$C_{30}$ alkenyl groups optionally substituted by one or more substituents, $C_6$-$C_{40}$ aryl groups optionally substituted by one or more substituents, or $R^1$ and $R^2$ together with the atom Z to which they are attached form a three- to thirty-membered ring optionally substituted by one or more substituents;
wherein $R^3$ to $R^{10}$ are identical or different and are independently selected from the group consisting of hydrogen, $C_1$-$C_{30}$ alkyl groups optionally substituted by one or more substituents, $C_6$-$C_{40}$ aryl groups optionally substituted by one or more substituents, or two of the substituents $R^3$ to $R^6$ or $R^7$ to $R^{10}$ attached to a carbon atom positioned vicinal to each other respectively, form with the carbon atom to which they are attached a cycloalkenyl or aryl group optionally substituted by one or more substituents;
with the proviso that said first precatalyst is not [R(2-R'$_3$Si-Ind)$_2$]MQ$_2$ wherein R' is alkyl having from 1 to 6 carbon atoms and R is a C- or Si-bridge between the two indenyl moieties;
(b) injecting propylene, either before or after or simultaneously with step (a), to produce polypropylene macromers;

(c) contacting a second active catalyst system with the polypropylene macromers formed in (b) without isolating the propylene macromers formed in (b), wherein the second active catalyst system comprises a second precatalyst and an activating agent having an alkylating and/or ionizing action, said second precatalyst being different from said first precatalyst and being of formula (I) as defined above without the proviso, wherein a weight ratio between the first precatalyst and the second precatalyst is from 1/2 to 100/1;

(d) wherein polymerization conditions are maintained throughout (a)-(c);

(e) retrieving a long chain branched polypropylene, wherein the long chain branched polypropylene has a total content of long chain branchings of higher than 5 per 10,000 C and the long chain branch has a number average (Mn) of at least 6,000 g/mol.

2. The process according to claim 1, wherein the polypropylene macromers have at least a molecular weight Mn greater than 6,000 g mol$^{-1}$ or have at least 420 carbon atoms.

3. The process according to claim 1, wherein (a) and (c) are carried out simultaneously by contacting the first and second precatalysts in the reactor together with the propylene.

4. The process according to claim 1, wherein said second active catalyst system is able to produce polypropylene incorporating said polypropylene macromers.

5. The process according to claim 1, wherein said first and second precatalysts are of formula (IIa), (IIb), or (IIc)

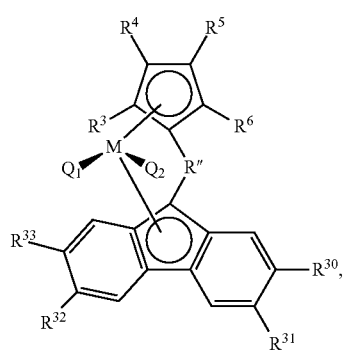
(IIa)

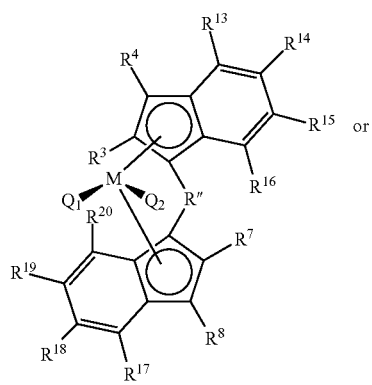
(IIb)

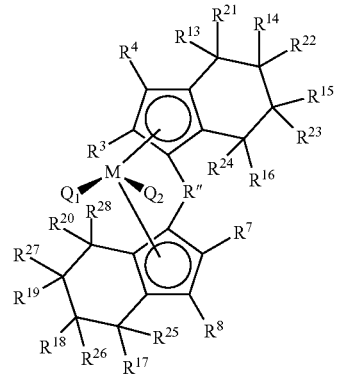
(IIc)

wherein M is a group IV transition metal;

wherein $Q_1$ and $Q_2$ are identical or different and are independently selected from the group consisting of amido, halogen, $C_1$-$C_{10}$ alkyl group, $C_6$-$C_{20}$ aryl group, an anionic ligand or a neutral ligand capable of coordination by a lone pair of electrons;

wherein R" is of formula —$[Z(R^1)(R^2)]_n$— wherein n is an integer between 1 and 5;

wherein Z is a carbon or silicon;

wherein $R^1$ and $R^2$ are identical or different and are independently selected from the group consisting of hydrogen, $C_1$-$C_{30}$ alkyl groups optionally substituted by one or more substituents, $C_1$-$C_{30}$ alkenyl groups optionally substituted by one or more substituents, $C_6$-$C_{40}$ aryl groups optionally substituted by one or more substituents, or $R^1$ and $R^2$ together with the atom Z to which they are attached form a three- to thirty-membered ring optionally substituted by one or more substituents;

wherein $R^3$ to $R^8$, $R^{13}$ to $R^{28}$ and $R^{30}$ to $R^{33}$ are identical or different and are independently selected from the group consisting of hydrogen, $C_1$-$C_{30}$ alkyl groups optionally substituted by one or more substituents, $C_1$-$C_{30}$ alkenyl groups optionally substituted by one or more substituents, $C_6$-$C_{40}$ aryl groups optionally substituted by one or more substituents, or two of the substituents $R^3$ to $R^8$, $R^{13}$ to $R^{28}$ and $R^{30}$ to $R^{33}$ attached to a carbon atom positioned vicinal to each other respectively, form with the carbon atom to which they are attached a cycloalkenyl or aryl group optionally substituted by one or more substituents;

with the proviso that said first precatalyst is not [R(2-R'$_3$Si-Ind)$_2$]MQ$_2$ wherein R' is alkyl having from 1 to 6 carbon atoms and R is a C- or Si-bridge between the two indenyl moieties.

6. The process according to claim 1, characterized in that said first precatalyst is of formula (III)

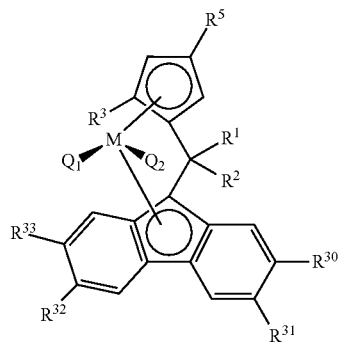

(III)

wherein $R^1$ is hydrogen or a hydrocarbyl group having from 1 to 20 carbon atoms, wherein $R^2$, $R^3$, $R^5$, are each, independently from one another, hydrogen, $C_1$-$C_{30}$ alkyl groups optionally substituted by one or more substituents, $C_1$-$C_{30}$ alkenyl groups optionally substituted by one or more substituents, $C_6$-$C_{40}$ aryl groups optionally substituted by one or more substituents, wherein $R^{30}$, $R^{31}$, $R^{32}$, $R^{33}$ are each, independently from one another, hydrogen, $C_1$-$C_{30}$ alkyl groups optionally substituted by one or more substituents, $C_6$-$C_{40}$ aryl groups optionally substituted by one or more substituents, or $R^{30}$ and $R^{31}$ or $R^{32}$ and $R^{33}$ form with the carbon atom to which they are attached a cycloalkenyl or aryl group optionally substituted by one or more substituents.

7. The process according to claim 1, wherein said second precatalyst is of formula (IIa) or (IIb)

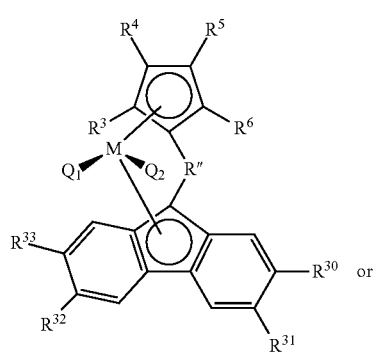

(IIa)

or

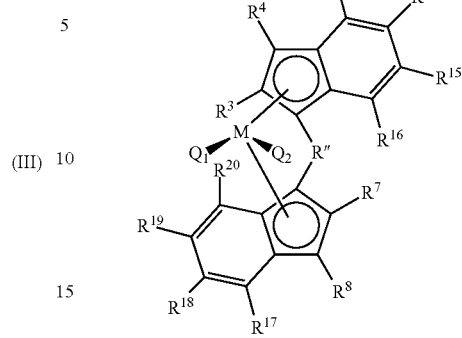

(IIb)

wherein $R^3$ to $R^8$, $R^{13}$ to $R^{20}$ and $R^{30}$ to $R^{33}$ are identical or different and are independently selected from the group consisting of hydrogen, $C_1$-$C_{30}$ alkyl groups optionally substituted by one or more substituents, $C_6$-$C_{40}$ aryl groups optionally substituted by one or more substituents, or two of the substituents $R^3$ to $R^8$, $R^{13}$ to $R^{20}$ and $R^{30}$ to $R^{33}$ attached to a carbon atom positioned vicinal to each other respectively, form with the carbon atom to which they are attached a cycloalkenyl or aryl group optionally substituted by one or more substituents.

8. The process according to claim 1, wherein the weight ratio between the first precatalyst and the second precatalyst is 1/1 to 50/1.

9. The process according to claim 1, wherein step (b) is performed at a temperature higher than 60° C.

10. The process according to claim 1, wherein the first precatalyst is selected from the group consisting of precatalysts of formula (3h), (3j), (3b), (3c), (3d), (3e), (3f); and the second precatalyst, different from the first precatalyst, is selected from the group consisting of precatalysts of formula (3j), (3h), (3i), (3a), (3b), (3c), (3d), (3e), (3f), and (3g),

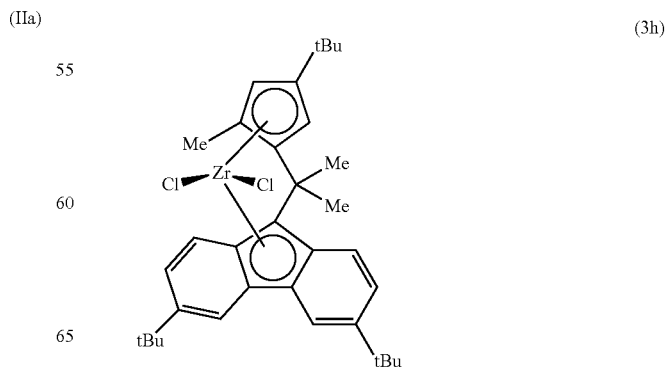

(3h)

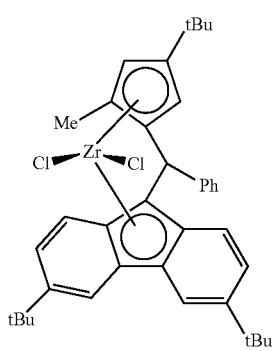
(3i)
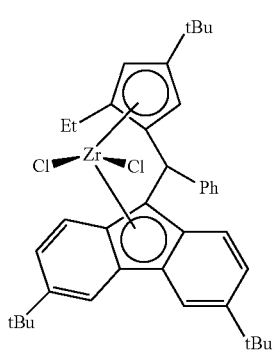
(3b)
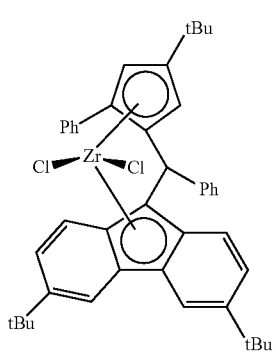
(3c)
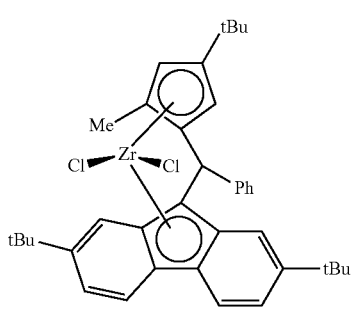
(3d)
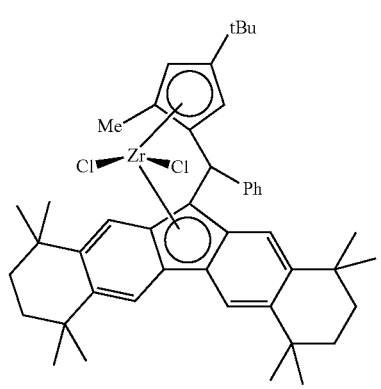
(3e)
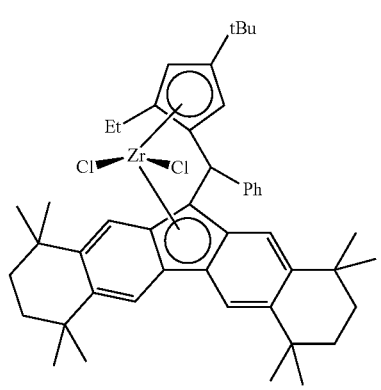
(3f)
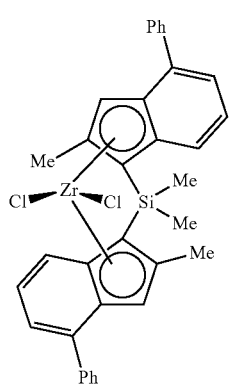
(3j)
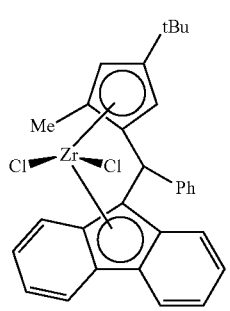
(3a)

-continued
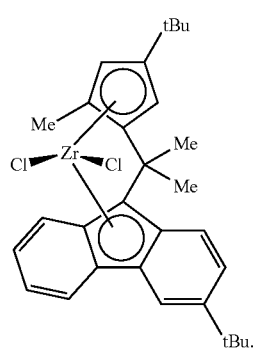
(3g)
* * * * *